Patented Jan. 26, 1937

2,068,818

UNITED STATES PATENT OFFICE 2,068,818

COMPOSITION FOR COATING PURPOSES CONTAINING A RUBBER DERIVATIVE

Frank B. Root, West Orange, N. J., assignor to Ellis-Foster Company, a corporation of New Jersey No Drawing. Application May 15, 1935, Serial No. 21,681

5 Claims. (Cl. 134—17)

This invention relates to a composition for coating and impregnating purposes containing a rubber derivative, particularly halogenated rubber, and relates especially to chlorinated rubber admixed with sulphurized tung oil or equivalent material, together with any necessary thinning agent adapted to form a composition which may be readily applied to surfaces of metal, wood, and the like.

The rubber derivative particularly used, as indicated, is that obtained by the chlorination of rubber and by carrying chlorination to a fairly high degree the resulting compound becomes sufficiently soluble in hydrocarbon thinners, such a toluol and solvent naphtha, that it may be easily applied to required surfaces. However, chlorinated rubber, even when perchlorinated, that is to say when it has been charged with the maximum amount of chlorine that it will take up easily to give, for example, a product containing 60 to 70 per cent of combined chlorine, does not work as freely under the brush as is sometimes desired, and I have found that this defect may be minimized by incorporating a sufficient proportion of a miscible tung oil of reduced drying characteristics.

The tung oil may be treated, for example, by giving it a light sulphurizing treat as, for instance, by heating it with 1% or less of elemental sulphur or, in some cases, by using sulphur chloride, sulphuryl chloride, and the like. I have also obtained a similar improved result by the use of selenium, and the use of such compounds as selenium and tellurium in the practice of my invention therefore is not precluded.

Although I prefer to use tung oil, I may employ other oils of equivalent properties, including oiticica oil and the like, and mention of "tung oil" in the claims is intended to cover the use of equivalents.

The lightly sulphurized tung oil has undergone a deep-seated change as a result of the action of even $\frac{1}{10}$ of a per cent up to, say, 1 per cent of sulphur. It has become highly compatible with chlorinated rubber and improves the adherence of the latter to, for example, various metal surfaces. The tung oil also enhances the water resistance of the coating and in no wise detracts from weathering qualities when the coating is used for exterior exposure.

A number of pigments may be employed when it is desired to pigment the composition, specifically those which are not affected by sulphur, such as zinc sulphide, lithopone, and the like.

In addition to chlorinated rubber I may employ other halogenated rubbers, by which term I include likewise related bodies such as gutta percha and balata, from which I may prepare, for example, brominated rubber or a mixture of chlorinated and brominated rubber, and the like.

The action of sulphur or analogous material in such small proportion on the tung oil greatly alters its drying characteristics so that it no longer acts as a drying oil in the usual sense of the term but falls rather into the class of the semi-drying or non-drying oils. The precise degree of residual siccative properties depends in large measure on the proportion of sulphur employed. Using $\frac{1}{10}$ of 1 per cent, for example, the oil remains moderately siccative, whereas when 1% or thereabouts is used the oil becomes practically non-siccative. I prefer not to increase the content of sulphur employed in this step beyond 1 or 2% as substantially higher proportions tend to detract from the weathering qualities of the composition.

The following examples are given to show methods of making the sulphurized oil in its preferred form and suggested formulas for use with chlorinated rubber in lacquers and enamels.

*Example 1.*—One per cent of sulphur was added to tung oil and the mixture was heated slowly to 280° C. Ordinarily tung oil alone forms a gel in about 10 minutes at this temperature. In this case, however, the oil did not gel after heating for an hour and a half. Some darkening occurred during heating but the viscosity increased relatively little. The resulting oil was non-drying. A film after three months was still wet and showed none of the frosting characteristics of tung oil in drying. The odor, although mild, was somewhat similar to other types of sulphurized oils.

*Example 2.*—A quantity of tung oil was treated with 0.1% sulphur and heated slowly to 200° C. to produce an oil of honey-like consistency and color. Thus prepared the oil showed slight drying properties. That is, a film exposed to the air for a month hardened somewhat and became frosted to some extent. When a portion of the oil was reheated to 270° C. and allowed to cool the color and viscosity were not appreciably changed but a film after a month was still tacky.

*Example 3.*—One-half per cent of flowers of sulphur was stirred into tung oil and the mixture was heated. At 210° C. the color began to darken very gradually and when the temperature reached 250° C. a slight amount of foaming occurred. When cool it was found that the oil had increased very slightly in body and was of a clear lightamber color. A film showed very little tendency to harden or frost during two months.

*Example 4.*—One hundred parts of tung oil and 0.5 part of selenium powder were heated and the well-stirred mixture was kept at between 260° and 270° C. for 10 minutes. During this time only a portion of the selenium dissolved. The oil was allowed to cool and the unreacted selenium settled out, leaving a very light-colored, non-viscous liquid of slight odor similar to that of the sulphurized product.

In general, as noted above, the amount of sulphur to add to tung oil for the purposes of this invention is not substantially above 1 or 2%. When 10% of sulphur is used an infusible gel is formed. One-tenth per cent of sulphur and heating to a temperature above about 250° C. is adequate to reduce the drying capacity of tung oil so that for practical purposes it may be considered non-drying. Selenium is somewhat more effective than sulphur. Sulphurization results in stabilizing the oil toward further physical change on aging so that, when used as a plasticizer or for similar purpose, brittleness of the film does not ultimately set in as when raw or bodied drying oils are used.

*Example 5.*—To 100 parts of a 20% solution of chlorinated rubber (for example, the type sold under the trade name Tornesit) in xylene there was added 16.8 parts of the sulphurized tung oil described in Example 1. A clear, stable solution resulted which gave tough, light-colored films when applied to metal.

*Example 6.*—Five parts of sulphurized tung oil (described in Example 2) were added to 45 parts of a 25% solution of chlorinated rubber in toluene. A film from this solution was clear but somewhat brittle when thoroughly dry.

*Example 7.*—The amount of sulphurized tung oil in Example 6 was increased to 7 parts. A film from this solution was clear, tough and non-brittle. It showed excellent adhesion to steel surfaces.

*Example 8.*—When the amount of sulphurized tung oil in Example 6 was increased to 8.5 parts a slightly soft film resulted. This lacquer also was firmly adherent to steel.

*Example 9.*—Sixteen parts of sulphurized tung oil described in Example 1 and 15 parts of Indian red were ground to a paste in a paint mill. This paste and 20 parts of chlorinated rubber were added to a solvent mixture consisting of 25 parts xylene and 50 parts solvent naphtha. When the chlorinated rubber had dissolved a smooth, free-brushing enamel was obtained.

*Example 10.*—Fifty-six parts of sulphurized tung oil (Example 1) and 56 parts of chromium oxide were ground to form a paste and mixed into a solution of 75 parts of chlorinated rubber in 280 parts of xylene. This green enamel produced a coating that was somewhat brittle when thoroughly dry. An additional 20 parts of sulphurized tung oil added to the enamel produced a softer film.

*Example 11.*—A white paste was made by grinding 2 parts of zinc oxide and $\frac{1}{6}$ part of titanium oxide in 4 parts of a 33% solution of chlorinated rubber in xylene. Two pounds of this paste was mixed with 2 lbs. of chlorinated rubber solution (25%) in xylene and 1 lb. sulphurized tung oil (Example 1). This produced a light-stable white enamel of brushing consistency. For spraying about 2 lbs. additional solvent are added.

The proportion of sulphurized oil to chlorinated rubber varies according to the type of coating. For example, when used as an artificial leather coating, a great deal more plasticizer is added than when a wood lacquer is required. Also, with more viscous oils, such as obtained by sulphurizing bodied tung oil, larger amounts are permissible without making the lacquer film unduly soft. In general, for a clear lacquer the proportion of oil varies from about ½ to 1 part to 1 part of chlorinated rubber and is preferably about ¾ part. Other plasticizers can be used along with the halogenated rubber if desired; for example, tricresyl phosphate, dibutyl phthalate or abietic esters. In enamels the amount of sulphurized oil is substantially increased. Halogenated rubber of varying viscosity characteristics can be used depending upon requirements. Coal-tar hydrocarbons are the principal cheap solvents for use in chlorinated rubber lacquers. However, some dilution with petroleum hydrocarbons is possible.

Sulphurized tung oil provides a cheap, physically stable plasticizer and with chlorinated rubber enables light-stable, tough, firmly adherent coating compositions to be obtained. The oil is readily soluble in all liquids that are solvents for the rubber derivative; therefore, no special blending solvents are required. Also, chlorinated rubber solutions when sprayed have a tendency to "spider-web" unless the viscosity is very low. Sulphurized tung oil reduces this tendency.

Besides being a plasticizer for chlorinated rubber, the lightly sulphurized oils of this invention are also compatible with nitrocellulose and can be used in pyroxylin lacquers.

What I claim is:

1. A coating composition comprising chlorinated rubber and tung oil sulphurized by heating with substantially not more than 1% of sulphur.

2. A process which comprises reacting upon a drying oil with sulphur, in amount not considerably in excess of 1%, based on the amount of said oil, and incorporating the reaction product with a solution of chlorinated rubber.

3. A process which comprises reacting upon tung oil with sulphur, in amount not considerably in excess of 1%, based on the amount of said oil, and incorporating the reaction product with a solution of chlorinated rubber.

4. A coating composition comprising chlorinated rubber and a drying oil which oil has been treated with not substantially more than 1% of an element of the class consisting of sulphur, selenium and tellurium.

5. A coating composition comprising chlorinated rubber and tung oil which oil has been treated with not substantially more than 1% of an element of the class consisting of sulphur, selenium and tellurium.

FRANK B. ROOT.